Feb. 25, 1964 R. ERDMENGER 3,122,356
WORM ARRANGEMENT
Filed Aug. 17, 1959 3 Sheets-Sheet 1

INVENTOR.
RUDOLF ERDMENGER
BY
Burgess, Dinklage & Sprung
ATTORNEYS

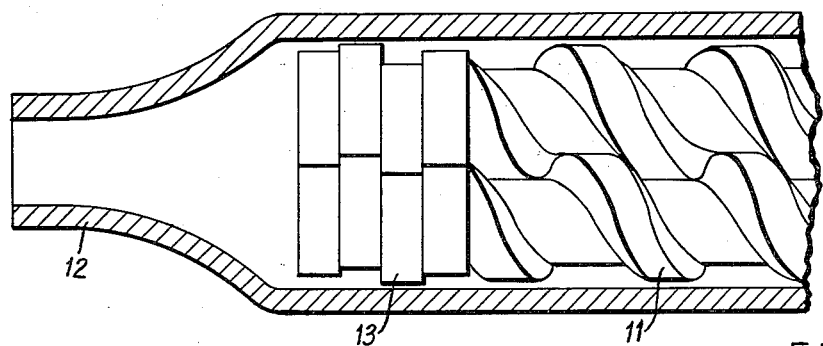
FIG. 4
FIG. 3
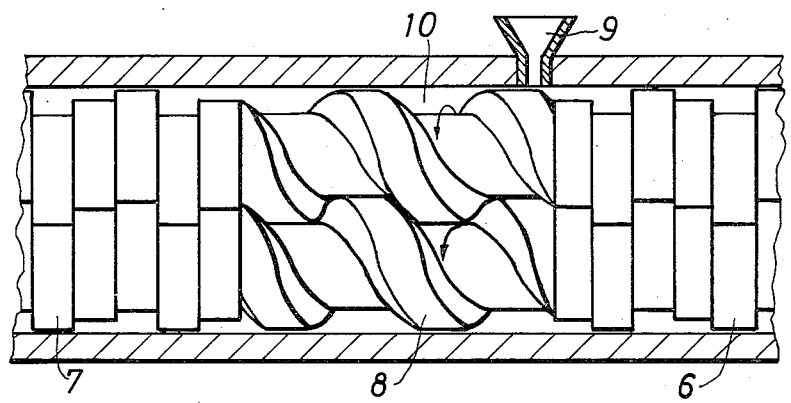

United States Patent Office 3,122,356
Patented Feb. 25, 1964

3,122,356
WORM ARRANGEMENT
Rudolf Erdmenger, Bergisch Gladbach, Germany, assignor to Farbenfabriken Bayer Aktiengesellschaft, Leverkusen, Germany, a corporation of Germany
Filed Aug. 17, 1959, Ser. No. 834,252
Claims priority, application Germany Aug. 23, 1958
9 Claims. (Cl. 259—104)

The invention relates to a worm arrangement for mixing and kneading powder or plastic substances and having at least two worms advancing the substances through a housing, the said worms being subdivided into a plurality of sections which are constructed as axially-conveying worm elements and which have external forms different from one another.

In this combined arrangement the compressing and squeezing forces which are directed transversely to the axis are made substantially independent of the friction of the material on the conveyor element and on the walls of the apparatus. Accordingly, at least one section consists of disc members which are arranged concentrically or eccentrically and which are offset helically at an angle to one another in such a way that the peripheries thereof in any position of rotation, substantially contact those disc elements arranged on the adjacent shaft.

By this means, it is possible substantially to adapt the worm arrangement to the prevailing condition of the substance (granular, viscous, plastic or the like), to the type of substance and also to the processing procedure (for example extrusion, granulation, plasticization, or the evaporation of wet solids from gelled plastics). The compressing or squeezing forces directed transversely to the axis by means of concentric or eccentric disc elements cause excellent mixing effects with granular, viscous or plastic products.

As a result of the combined arrangement of the threaded worms and disc elements or kneading discs, there is obtained an improved feeding of the substances, a more accurate determination of the residence time and a better mixing operation. It is also possible to process substances which change their state of aggregation in the apparatus during the treatment.

A better understanding of the invention may be gained by reference to the accompanying drawings, in which FIG. 1 is a side view of a longitudinal section of the invention;

FIG. 3 illustrates a modification of the device of FIG. 1;

FIG. 4 illustrates another modification of the device of FIG. 1;

Figure 1:
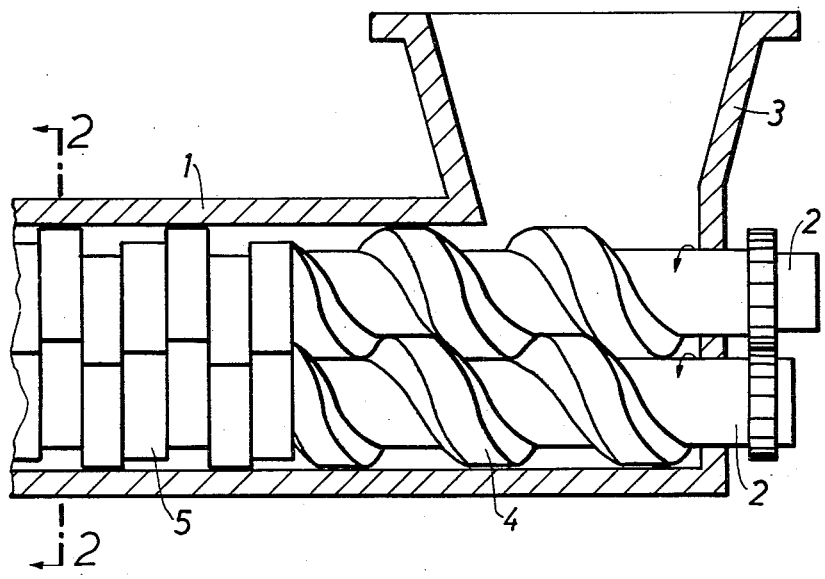
Figure 2:
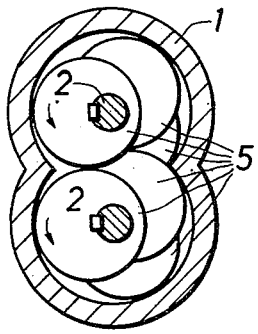
FIG. 2 is a cross-section of FIG. 1 along line 2—2 thereof, illustrating eccentrically arranged kneading discs.
Figure 5:
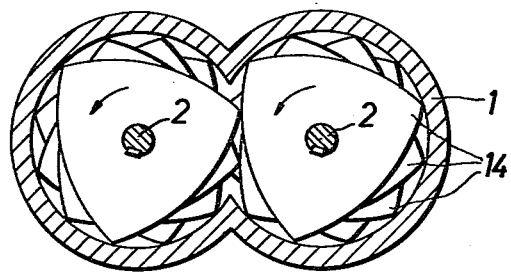
FIG. 5 is a cross-section similar to that in FIG. 2 but illustrating concentrically arranged kneading discs.

Examples of uses of combinations of the worm sections are explained by reference to the diagrammatic drawings. FIG. 1 shows a worm arrangement consisting of two shafts 2 rotating in the same direction and disposed parallel to each other in the housing 1, the shafts carrying worm elements. Those sections 4 of the worm which are nearest the filling hopper are formed as threaded worms and the sections 5 as worm elements composed of kneading discs. FIG. 2 is a section through the part comprising the kneading disc. FIG. 5 is a cross-section corresponding to the cross-section shown in FIG. 2, but for a device according to the invention wherein the kneading discs are concentric rather than eccentric, as is the case for the discs shown in FIG. 2. Thus, the discs 14 in FIG. 5 are mounted so as to be concentric with respect to each other, whereas the discs 5 in FIG. 2 are eccentric with respect to each other.

With given substances, the ratio between the pitches can be so chosen that (a) the kneading disc worm 5 is only partially filled with one component of the mixture. As well as with drying or gasifying processes, this is for example desirable when an additional component (such as a liquid) is introduced into the kneading chamber and completely fills it in co-operation with the first component. Thus it is made to operate in the best possible manner.

(b) The kneading disc worm 5 is completely filled by the substance introduced from the hopper 3 and conveys this substance forward at the speed corresponding to its actual pitch, or (c) The kneading disc worm is also completely filled by the substance, but this substance is conveyed by the feeding spiral 4 at a higher speed no longer corresponding to the pitch of the kneading disc worms.

In operation as described in (c), the linear speed of material conveyed by the section formed as threaded worms is larger than the linear speed of material conveyed by the section formed as disc worms. For providing such higher speed of flow in the threaded worm section, the relative pitch and free cross-sectional area of the disc and worm sections can be proportioned in a suitable manner. My "free cross-sectional area" is meant the area unoccupied by any equipment elements and therefore available for flow of material through the equipment. For higher linear speed in the threaded worm section, a greater worm pitch can be provided, or a reduced cross-sectional area can be utilized, reference being made to corresponding dimensional values of the disc worm section. Thus, for higher speed in the threaded worm section than in the disc worm section, and if the free cross-sectional area in each of these sections is the same, the pitch of the threaded worm section is greater than the pitch of the disc worm section. Alternatively, if the pitch of the two worm sections is the same, then the free cross-sectional area of the threaded worm section should be greater than the free cross-sectional area of the disc worm section. Appropriate variation in both relative pitch and relative free cross-sectional area can be utilized in order to obtain the desired effect of higher quantity flow in the threaded worm section.

For example, it is possible in this way to lower the temperature of a continuously expelled kneading material, since the heat corresponding to the mechanical driving output is distributed over a larger quantity of substance. Should it be desired for this purpose to increase the pitch of the kneading discs, such as by choosing a larger width for the discs, the system would correspondingly take up more driving output, whereby nothing would be gained. The correct combination of a threaded worm with a kneading disc worm thus renders possible the limitation of a certain temperature in the substance by improved throughput (without removal of heat).

As another example of the use of a preferred combination of the said elements, there is to be mentioned the interposition of a chamber which is relatively fluid-tight at both ends of the shafts and from which the gases or vapours can be extracted, if desired in vacuo. FIG. 3 shows the principle of this arrangement, in which a threaded section 8 is interposed between two kneading disc worms 6 and 7. The pitch of the threaded section 8 is preferably of such dimensions that the substance in this zone (for a relatively short time), is conveyed at a higher speed and therefore is not only relieved of load, but is also expanded or broken up. An outlet opening 9 suitable for the discharge of vapours or gases is for example disposed at the start of the threaded section, when seen in the direction of flow, since the pressure of the substance rises again towards the end of this section and possibly causes stoppages. The arrangements shown in FIGS. 1 and 3 can be combined, and such a combination of arrangements has proved suitable for the working of thermoplastic synthetic materials which are generally introduced into the machine, as a powder and are plasticized therein. The kneading disc worms 5 and 6, disposed between the feeding hopper 3 of FIG. 1 and the vacuum chamber 10 of FIG. 3, accelerate the conversion of the product in granular form into the plasticized (gelled) form because of the strong working of the substance. This is only made possible by the reliable sealing off of this chamber and the discharge of vapours or gases at relatively high temperatures (130 to 200° C.). It is thus possible to manage with a shorter length of the machine and without heated surfaces, since the heat is largely generated in the substance itself.

Figure 6:
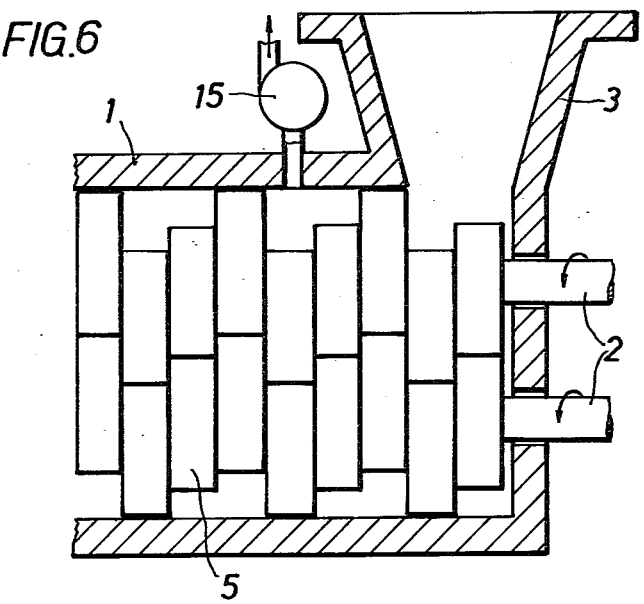
FIG. 6 illustrates a further modification of the invention.

The provision of an air-tight arrangement adjacent the hopper 3 is indicated in FIG. 6, wherein the pump 15 is provided adjacent the hopper 3. The pump 15 is an evacuating pump and serves to provide the desired seal.

As a third example which shows the expediency of a combination of threaded worms and kneading disc worms, there is to be mentioned the construction of the ejection end of an extrusion press. Devices in which a shaped nozzle is connected to the end of two threaded worm shafts, and which expel the material from the nozzle already gelled and homogenized are known. For example, when manufacturing continuous lengths or tubes, it is possible to observe that the mass does not flow out at a constant speed, but with periodic impulses. This produces disadvantages; for example, it is not possible to obtain pieces of equal length when cutting the strands, and the material develops local differences in density of zones of reduced strentgh. The uniform sequence of such defective zones can be attributed to an action caused by the shape of the worm thread before the nozzle.

FIG. 4 shows how such defects are avoided. A kneading disc worm 13 is attached to the thread section 11 in the immediate vicinity of the nozzle 12. By this means, the material is again homogenized before it is expelled. The pressure applied by the threaded worms 11 in front of the nozzle 12 is scarcely reduced at all by the short kneading disc section.

The effective cross-sections of the individual sections which have been described can be of equal or different dimensions. In the latter case, the pitches of the different systems (thread or kneading discs) are given a different ratio to one another, as in the case of equal effective cross-sections. The separate threads or kneading disc sections can be made in one piece with the shaft. They can however also be cut on sleeves or be directly pushed on to the shaft.

I claim:

1. A worm arrangement for use in mixing powder and plastic materials comprising, a housing, at least two worms rotatable in the same direction in said housing in contact with one another for conveying said materials therethrough, each of said worms being subdivided into a plurality of axially arranged sections, wherein at least one of said sections consists of threaded conveying worm elements and at least one of said sections consists of discs arranged one behind the other on said worm with each disc being offset at an angle helically with respect to the next succeeding disc, the discs on one of said worms being positioned in substantially near adjacent circumferential contact with opposed discs on the other worm at any position of rotation of said worm and further characterized in that the linear speed of the material conveyed by the sections formed as threaded worms is greater than the linear speed of the material conveyed by the sections formed as disc worms, and in that at least one of said threaded worm sections precedes a disc section on each of said worms.

2. Worm arrangement according to claim 1, wherein said discs are centrally positioned on said worms.

3. Worm arrangement according to claim 1, wherein said discs are eccentrically positioned on said worms.

4. Worm arrangement according to claim 1, wherein a threaded worm section is interposed between two disc worm sections and wherein said housing is formed at the farther-most ends of said disc worm sections as an airtight chamber.

5. Worm arrangement according to claim 1, wherein said housing has a discharge end constructed in the form of a nozzle and wherein the worm section on each worm adjacent the nozzle is a disc worm section.

6. A worm arrangement for use in mixing powder and plastic materials, comprising a housing, at least two worms rotatable in the same direction in said housing in contact with one another for conveying said materials therethrough, each of said worms being subdivided into a plurality of axially arranged sections, wherein at least one of said sections consists of threaded conveying worm elements and at least one of said sections consists of discs arranged one behind the other on said worm with each disc being offset at an angle helically with respect to the next succeeding disc, the discs on one of said worms being positioned in substantially near adjacent circumferential contact with opposed discs on the other worm at any position of rotation of said worm and characterized in that for each worm the effective pitch of the threaded worm section is larger than the effective pitch of the disc worm section and in that at least one of said threaded worm sections precedes a disc section.

7. In a method for mixing powder and plastic materials by parallel arranged worms having successive zones of threads and discs and a closed housing forming a chamber about the worms, the steps which comprise feeding said materials by rotating the worms in the same direction within the housing and maintaining the linear speed of material conveyed by the section formed as threaded worms greater than the linear speed of material conveyed by the section formed as disc worms.

8. Method according to claim 7, which comprises venting gases formed in said mixing from said chamber in the region of a threaded worm section.

9. An arrangement according to claim 4 and including means communicating with the chamber for evacuating gases therefrom.

References Cited in the file of this patent

UNITED STATES PATENTS

| 2,434,707 | Marshall | Jan. 20, 1948 |
| 2,485,854 | Zona | Oct. 25, 1949 |
| 2,563,396 | Colombo | Aug. 7, 1951 |
| 2,631,016 | de Laubarede | Mar. 10, 1953 |
| 2,670,188 | Erdmenger | Feb. 23, 1954 |
| 2,814,472 | Erdmenger | Nov. 26, 1957 |
| 2,916,769 | Baigent | Dec. 15, 1959 |

FOREIGN PATENTS

| 480,102 | Italy | Apr. 22, 1953 |
| 530,321 | Italy | July 8, 1955 |